3,812,167
GERMANIUM DERIVATIVE
Ung Soo Pahk, % U.S. Pahk Heart Foundation, 1028
 Connecticut Ave. NW., Washington, D.C. 20036
No Drawing. Filed Oct. 8, 1971, Ser. No. 187,877
Claims priority, application Canada, Aug. 27, 1971,
121,624
Int. Cl. C07f 7/00
U.S. Cl. 260—429 R          3 Claims

ABSTRACT OF THE DISCLOSURE

There is disclosed the carboxyethyl germanium sesquioxide which is useful in the treatment of hypertension.

---

The present invention relates to a novel derivative of germanium which is particularly useful in the treatment of many disorders of humans.

The novel compound of present invention is the carboxyethyl germanium sesquioxide.

The novel compound of the present invention is prepared by dissolving germanium dioxide in a mineral acid, for example, hydrochloric acid, adding monobasic sodium phosphate and heating the mixture at 100° C. for about 30 minutes. The solution is then cooled and ammonium hydroxide is added whereby a precipitate of germanium dihydroxide is formed which readily converts to trihalogerman by the addition of a hydrohalic acid such as hydrochloric acid or hydrobromic acid. The trihalogerman is then reacted with acrylonitrile to form the $\beta$-cyanoethyltrihalogerman which upon heating with hydrogen peroxide forms the desired carboxyethyl germanium sesquioxide.

The novel compound of the present invention is particularly useful in the treatment of hypertension. A most interesting feature of the present invention is that prolonged use will not cause hypotension as is found when using many of the drugs normally used in the treatment of hypertension. Another feature of the novel compound of the present invention is that its use in the treatment of hypertension improves both systolic pressure and diastolic pressure whereas antihypertensive drugs do not normally improve diastolic blood pressure. It has also been observed that most antihypertensive agents provoke headaches or migraines as a side reaction, but surprisingly the compound of the present invention causes no such side reactions and in many cases it has been found useful to alleviate headaches or migraines. Furthermore, the compound of the present invention does not cause ptosis or general dullness nor does prolonged treatment cause loss of appetite.

The product is administered in a dosage unit of from 100 to 200 mg. with a preferred dosage of about 160 mg. twice a day and because it is relatively non-toxic very high dosages can be administered when needed.

The product of the present invention is administered in admixture with the excipients normally used for oral administration and which are well known in the pharmaceutical art.

The preparation of the product of the present invention will be more fully understood by referring to the following example which is given to illustrate rather than limit the scope of the present invention.

EXAMPLE 1

400 g. of germanium dioxide is dissolved in 1000 ml. of N hydrochloric acid. To the solution obtained there is added 900 ml. of a saturated solution of monobasic sodium phosphate and the mixture is heated at 100° C. for about 30 minutes. The solution obtained is cooled and an ammonium hydroxide solution is added whereby there is formed a precipitate of about 300 g. of germanium dihydroxide. The latter precipitate of germanium di-hydroxide is dissolved in 1000 ml. of 3.5 N hydrochloric acid to form a solution of trichlorogerman. To 1000 ml. of trichlorogerman solution are added 1800 ml. of acrylonitrile while stirring, forming a solution of $\beta$-cyanoethyltrichlorogerman to which there is added 3000 ml. of hydrogen peroxide while boiling for 10 hours after which a precipitate of carboxyethyl germanium sesquioxide is filtered off. The product decomposes of about 315° C.

I claim:
1. A process for preparing carboxyethyl germanium sesquioxide comprising dissolving germanium dioxide in a mineral acid, adding monobasic sodium phosphate to the solution, then adding ammonium hydroxide to the solution to precipitate germanium dihydroxide, dissolving the germanium dihydroxide in aqueous hydrohalic acid to form trihalogerman solution, adding acrylonitrile to the solution to form beta-cyanoethyltrihalogerman and reacting the beta-cyanoethyl trihalogerman with hydrogen peroxide to form the carboxyethyl germanium sesquioxide.
2. A process according to claim 1 wherein the hydrohalic acid is hydrochloric acid or hydrobromic acid.
3. A process according to claim 2 wherein the mineral acid is hydrochloric acid.

References Cited

UNITED STATES PATENTS 3,689,516    9/1972    Asai et al. _____ 260—429 R

PATRICK P. GARVIN, Primary Examiner
A. P. DEMERS, Assistant Examiner

U.S. Cl. X.R.

260—999